United States Patent
Yuan et al.

(10) Patent No.: US 12,033,034 B2
(45) Date of Patent: Jul. 9, 2024

(54) ENTANGLED STATE PREPARATION METHOD AND DEVICE BASED ON SUPERCONDUCTING QUANTUM BIT AND RYDBERG ATOM

(71) Applicant: South China Normal University, Guangdong (CN)

(72) Inventors: Jianhao Yuan, Guangdong (CN); Dejian Pan, Guangdong (CN); Qinzhou Ye, Guangdong (CN); Zhentao Liang, Guangdong (CN); Hui Yan, Guangdong (CN)

(73) Assignee: South China Normal University, Guangzhou (CN)

( * ) Notice: Subject to any disclaimer, the term of this patent is extended or adjusted under 35 U.S.C. 154(b) by 412 days.

(21) Appl. No.: 17/611,127

(22) PCT Filed: Mar. 16, 2021

(86) PCT No.: PCT/CN2021/080997
§ 371 (c)(1),
(2) Date: Nov. 12, 2021

(87) PCT Pub. No.: WO2021/190349
PCT Pub. Date: Sep. 30, 2021

(65) Prior Publication Data
US 2022/0222565 A1      Jul. 14, 2022

(30) Foreign Application Priority Data
Oct. 26, 2020    (CN) .......................... 202011157980.8

(51) Int. Cl.
*G06N 10/40*        (2022.01)
*G06N 10/20*        (2022.01)

(52) U.S. Cl.
CPC ............. *G06N 10/40* (2022.01); *G06N 10/20* (2022.01)

(58) Field of Classification Search
CPC .............................. G06N 10/40; G06N 10/20
See application file for complete search history.

(56) References Cited

U.S. PATENT DOCUMENTS

2014/0314419 A1    10/2014    Paik

FOREIGN PATENT DOCUMENTS

| CN | 109001137 A | 12/2018 |
| CN | 111260066 A | 6/2020 |
| CN | 111382873 A | 7/2020 |

OTHER PUBLICATIONS

Zhen-Tao Liang et al., Coherent Coupling between Microwave and Optical Fields via Cold Atoms, Chin. Phys. Lett., Aug. 31, 2019, pp. 080301-1 to 080301-5, vol. 36, No. 8.

*Primary Examiner* — Nicole M Ippolito
*Assistant Examiner* — Hanway Chang

(57) ABSTRACT

Disclosed are an entangled state preparation method and device based on a superconducting quantum bit and a Rydberg atom. With the help of two strong microwave driving fields, an unconventional geometric quantum gate is achieved, as to complete the preparation of a maximum entangled state. The influence of a laser field and a magnetic field required by the Rydberg atom and a radiation-cooled superconducting coaxial cable on the coherence of the superconducting quantum bit may be reduced.

10 Claims, 2 Drawing Sheets

The superconducting quantum bit is resonantly coupled with a selected mode of a superconducting transmission line cavity, at the same time two Rydberg states of the Rydberg atom are resonantly coupled with a superconducting planar waveguide cavity, or the two Rydberg states of the Rydberg atom are resonantly coupled with a superconducting planar LC resonant cavity, and the superconducting planar waveguide cavity or the superconducting planar LC resonant cavity is resonantly coupled with the selected mode of the superconducting transmission line cavity.

The coupling strength $g_1$ of the superconducting quantum bit and superconducting transmission line cavity, and the coupling strength $g_2$ of the Rydberg atom and the superconducting planar waveguide cavity (or the Rydberg atom and the superconducting planar LC resonant cavity) are adjusted, so that they satisfy a relationship of $J = 2\sqrt{g_1 g_2}$ with the coupling strength J between the superconducting transmission line cavity and the superconducting planar waveguide cavity (or the superconducting transmission line cavity and the superconducting planar LC resonant cavity).

With the help of two strong microwave driving fields, the unconventional geometric quantum operation is achieved, so the effective coupling between the quantum bits is generated.

A specific time is selected so that a time evolution operator of the Rydberg atom and the superconducting bit state transmission is insensitive to a thermal state, by which the preparation of the maximum entangled state is completed.

Fig. 2

ENTANGLED STATE PREPARATION METHOD AND DEVICE BASED ON SUPERCONDUCTING QUANTUM BIT AND RYDBERG ATOM

TECHNICAL FIELD

The present invention relates to the technical field of quantum information, in particular, to a method and device for preparing an entangled state of a superconducting quantum bit and a Rydberg atom through a thermally coupled cavity, and it may be applied to a wide range of quantum information fields (including quantum storage, quantum communication and quantum computation and other technical directions).

BACKGROUND

Quantum interfaces or entanglements between different quantum systems (a superconducting quantum bit, a trapped ion, a quantum dot, a diamond color center, a cold atom, a doped ion crystal, a photon, a phonons, etc.) are essential for achieving distributed quantum computation. The different experimental systems have their own advantages and disadvantages. For example, the superconducting quantum bit has fast operation speed and strong expandability, but it works in a microwave band and lacks optical band transition itself, and it needs the assistance of other quantum systems to interconnect with an optical quantum network. The cold atom system with both microwave band transition and optical band transition is one of the preferred systems. Therefore, the achievement of quantum information exchange between a superconducting quantum circuit and the cold atom system is vital for a research for achieving a distributed superconducting quantum computer. The system that combines the different experimental systems is called composite system, and the key to research the composite system is to achieve the quantum interfaces or entanglements between the different experimental systems. A Rydberg atom excites an electron of the atom to an orbit with a higher principal quantum number, so it has a large electric dipole moment and thus is easy to interact with the outside world. Therefore, the research of the superconducting quantum bit and cold atom composite system is generally that the cold atom is excited to a Rydberg state, and respectively coupled with the superconducting quantum bit and the Rydberg atom through a coupled cavity, where the quantum interface or entanglement between them is achieved. The quantum interface or entanglement between the superconducting quantum bit and the cold atom may achieve a composite atom-photon quantum gate, and is helpful to achieve the quantum storage of atoms and a quantum converter.

A superconducting quantum bit chip needs to be installed on a ≤50 mK platform of a dilution refrigerator, and is easily de-cohered by the environmental influence. In order to reduce the adverse effects of background black body radiation and stray infrared light, it is usually shielded and protected by a multi-layer opaque shielding layer. In addition, multi-layer magnetic shielding is required to protect from electromagnetic noise. The existing superconducting quantum bit and cold atom composite systems all install superconducting chips and trap cold atoms on the same refrigeration platform of a refrigerator. Transferring and trapping the cold atom near the superconducting quantum bit may inevitably destroy the radiation shielding and magnetic shielding, reduce the coherence of the superconducting quantum bit, and needless to say, to excite the cold atom to a high-power laser field requires a Rydberg state. Installing the superconducting chip and trapping the Rydberg atom on the same refrigeration platform may reduce the coherence of the superconducting quantum bit, and it is not beneficial to quantum state transmission or entanglement. Placing the superconducting chip and the Rydberg atom on different refrigeration platforms is one of the ways to solve a problem that the coherence of the superconducting quantum bit is affected by a laser, but there is a temporary lack of a high-fidelity quantum interface or entanglement scheme of the non-local superconducting quantum bit and the Rydberg atom.

The non-local quantum interface or entanglement on the different platforms has the disadvantages of low-fidelity and slower speed compared to the local quantum state transmission. Therefore, it is necessary to propose a technical means, on the one hand, that the non-local quantum interface or entanglement between the superconducting quantum bit and the cold atom may be achieved, so that the coherence of the superconducting quantum bit is not affected; and on the other hand, the fidelity and speed must achieve the performance of the local system, namely it is higher than a threshold of achieving quantum network or distributed quantum computation.

SUMMARY

In view of this, in order to solve the above problems in an existing technology, the present invention provides an entangled state preparation method and device based on a superconducting quantum bit and a Rydberg atom. An experiment is simple in device structure, and strong in feasibility under existing experimental conditions. In addition, the speed of completing the preparation of an entangled state is fast, and the fidelity is high.

The present invention solves the above problems through the following technical means.

In one aspect, the present invention provides an entangled state preparation method based on a superconducting quantum bit and a Rydberg atom, including the following steps.

The superconducting quantum bit is resonantly coupled with a selected mode of a superconducting transmission line cavity, at the same time two Rydberg states of the Rydberg atom are resonantly coupled with a superconducting planar waveguide cavity/superconducting planar LC resonant cavity, and the superconducting planar waveguide cavity/superconducting planar LC resonant cavity is resonantly coupled with the selected mode of the superconducting transmission line cavity.

The coupling strength $g_1$ of the superconducting quantum bit and superconducting transmission line cavity, and the coupling strength $g_2$ of the Rydberg atom and the superconducting planar waveguide cavity/superconducting planar LC resonant cavity are adjusted, so that they satisfy a relationship of $J=2\sqrt{g_1 g_2}$ with the coupling strength J between the superconducting transmission line cavity and the superconducting planar waveguide cavity/superconducting planar LC resonant cavity.

With the help of two strong microwave driving fields, an unconventional geometric quantum gate is achieved, so the effective coupling is generated between the quantum bits.

A specific time is selected so that a time evolution operator of the Rydberg atom and the superconducting bit state transmission is insensitive to a thermal state, and the preparation of the maximum entangled state is completed.

Further, Hamiltonian of a composite system is expressed as follows under rotation wave approximation:

$$H = \sum_{i=1}^{2}\left(\omega_{ri}\hat{a}_i^\dagger \hat{a}_i + \frac{\omega_{qi}}{2}\hat{\sigma}_i^z\right) + \left(\sum_{i=1}^{2} g_i \hat{\sigma}_i^\dagger \hat{a}_i + J\hat{a}_1^\dagger \hat{a}_2 + H.C.\right)$$

Herein $\omega_{ri}=\omega_r$ is the cavity mode frequency of the i-th cavity, $\omega_{qi}=\omega_q$ is the frequency of the i-th quantum bit; $\hat{\sigma}_i^\dagger=|e\rangle_i\langle g|$, while i=1, it corresponds to a rise operator of the superconducting quantum bit, and while i=2, it corresponds to a rise operator of the Rydberg atom; $\hat{a}_1^\dagger$ and $\hat{a}_1$ are generation annihilation operators of a cavity mode of the superconducting transmission line cavity respectively; $\hat{a}_2^\dagger$ and $\hat{a}_2$ are generation annihilation operators of a cavity mode of the superconducting planar waveguide cavity or the superconducting planar LC resonant cavity respectively; $g_1$ and $g_2$ are the coupling strength of the superconducting quantum bit and the superconducting transmission line cavity and the coupling strength of the Rydberg atom and the superconducting planar waveguide cavity/superconducting planar LC resonant cavity; and $\hat{\sigma}_i^z$ is a Pauli operator of the i-th quantum bit.

Further, the superconducting transmission line cavity and the superconducting planar waveguide cavity/superconducting planar LC resonant cavity are resonantly coupled, and decorated states of describing coupled cavities system are non-degenerate, and are two eigenmodes with the frequencies $f_1=f+J$ and $f_2=f-J$ respectively, herein f is the frequency of the superconducting transmission line cavity and the superconducting planar waveguide cavity, and J is the coupling strength between the two coupled cavities; generation annihilation operators of two decorated states are described by the symmetric and antisymmetric superposition of two bare cavity mode operators, namely $$\hat{b}_1 = \frac{\hat{a}_1 + \hat{a}_2}{\sqrt{2}}$$

and $\hat{b}_2=(\hat{a}_1-\hat{a}_2)/\sqrt{2}$, the two eigenmodes are coupled with the superconducting quantum bit and the Rydberg quantum bit at the same time.

Further, the Hamiltonian of the composite system is rewritten as $H_r=H_1+H_2$ according to operators $\hat{b}_1$ and $\hat{b}_2$, herein:

$$H_1 = J\hat{b}_1^\dagger \hat{b}_1 + [\hat{b}_1(g_1\hat{\sigma}_1^\dagger + g_2\hat{\sigma}_2^\dagger) + H.C.]/\sqrt{2}$$

$$H_2 = -J\hat{b}_2^\dagger \hat{b}_2 + [\hat{b}_2(g_1\hat{\sigma}_1^\dagger - g_2\hat{\sigma}_2^\dagger) + H.C.]/\sqrt{2}$$

In a strong driving limit $\Omega\gg\{g_i,J\}$, $H_{eff}^{RF}=H_1+H_2$ is obtained, herein $$H_1 = \left(\hat{b}_1 e^{-iJt} + \hat{b}_1^\dagger e^{iJt}\right)(g_1\hat{\sigma}_1^x + g_2\hat{\sigma}_2^x)/2\sqrt{2}$$

$$H_2 = \left(\hat{b}_2 e^{iJt} + \hat{b}_2^\dagger e^{-iJt}\right)(g_1\hat{\sigma}_1^x - g_2\hat{\sigma}_2^x)/2\sqrt{2}$$

Due to $H_1$ and $H_2$ reciprocity, the evolution operator may be decomposed into:

$$U_{eff}(t) = e^{-i\int_0^T H_{eff} dt} = e^{-i\int_0^T H_1 dt} e^{-i\int_0^T H_2 dt} = U_1 U_2$$

while $$t_n = \frac{2n\pi}{J},$$

the evolution operator is insensitive to the thermal state.

Further, each eigenmode is initially in a mixed state in which the equilibrium photon number distribution is $P_n(\bar{n}_i)=\bar{n}_i^n/(1+\bar{n}_i)^{n+1}$, where $\bar{n}_i=(e^{hf_i/k_BT}-1)^{-1}$ is an average photon number of each eigenmode at a temperature T, and $f_i$ is the frequency of the i-th cavity. In order to reduce the adverse effects of a thermal photon during the preparation of the entangled state, the strong driving field is introduced in the quantum bit, before the unconventional geometric quantum gate operation, and the adverse effects of a thermal mode on the preparation of the entangled state are eliminated by a method of the unconventional geometric quantum gate.

In another aspect, the present invention further provides an entangled state preparation device based on a superconducting quantum bit and a Rydberg atom, including a ≤50 mK refrigeration platform of a dilution refrigerator, a 1 K refrigeration platform of the dilution refrigerator, a superconducting quantum bit, a variable coupler, a superconducting transmission line cavity, a superconducting planar waveguide cavity/superconducting planar LC resonant cavity, and a Rydberg atom.

Herein the superconducting quantum bit is installed on the ≤50 mK refrigeration platform of the dilution refrigerator; the coupling strength of the superconducting quantum bit and the superconducting transmission line cavity may be modulated by the variable coupler; one end of the superconducting transmission line cavity is fixed on the ≤50 mK refrigeration platform 1 of the dilution refrigerator and coupled with the superconducting quantum bit, and the other end is fixed on the 1 K refrigeration platform of the dilution refrigerator and coupled with the superconducting planar waveguide cavity/superconducting planar LC resonant cavity; and the superconducting planar waveguide cavity/superconducting planar LC resonant cavity is installed on the 1 K refrigeration platform of the dilution refrigerator and coupled with the Rydberg atom.

The preparation of the non-local entangled state between the superconducting quantum bit and the Rydberg atom is achieved through the superconducting transmission line cavity and the superconducting planar waveguide cavity/superconducting planar LC resonant cavity, and the coupling strength J between a superconducting coaxial cable and the superconducting planar waveguide cavity/superconducting planar LC resonant cavity is determined by processing before an experiment. The coupling strength between the superconducting quantum bit and the superconducting transmission line cavity is adjusted by the variable coupler, and the coupling strength between the superconducting planar waveguide cavity/superconducting planar LC resonant cavity and the Rydberg atom is adjusted at the same time, while a specific relationship of $J=2\sqrt{g_1 g_2}$ is satisfied and a specific time is selected. A time evolution operator of the Rydberg atom and the superconducting bit is insensitive to a thermal state, so the preparation of the entangled state between the superconducting quantum bit and the Rydberg atom may be achieved.

Further, the ≤50 mK refrigeration platform of the dilution refrigerator is used to cool the superconducting quantum bit to maintain a superconducting state thereof, and the 1 K refrigeration platform is used to transfer, imprison, prepare and manipulate the Rydberg atom.

Further, the superconducting quantum bit is a transmon superconducting quantum bit of a long coherence time.

Further, with the help of a driving field added to the quantum bit, an unconventional geometric quantum gate is achieved, and thereby the generation of the entangled state between the quantum bits is achieved; and at a specific time point, since a phase factor of the evolution operator does not depend on a cavity state, the process is thus insensitive to the thermal state.

Further, the Rydberg atom adopts two energy levels $$|g\rangle = \left|60P_{\frac{5}{2}}, m_J = \frac{1}{2}\right\rangle \text{ and}$$

$$|e\rangle = \left|59D_{\frac{5}{2}}, m_J = \frac{1}{2}\right\rangle$$

of an $^{87}$Rb atom as the quantum bits.

The present invention has the following beneficial effects.

1. The present invention does not need to trap and prepare the Rydberg atom on the ≤50 mK refrigeration platform, but on the 1 K refrigeration platform, so the coherence of superconducting quantum bit installed on the ≤50 mK refrigeration platform is not affected.

2. In order to eliminate the adverse effects of the thermal photon during the preparation of the entangled state, the present invention adds two strong microwave driving fields to achieve the unconventional geometric phase gate, the process is insensitive to the thermal state and may further improve the fidelity of the preparation of the entangled state.

3. The present invention achieves the preparation of the maximum entangled state, and has a fast speed, high-fidelity, and robustness to local random noise.

4. The numerical simulation of a master equation of the present invention indicates the preparation of the entangled state between the quantum bits, the fidelity and time of |eg⟩ →(|eg⟩ +i|ge⟩ )/√2 may reach 0.99 and 50 ns, respectively, which may promote the development of the distributed superconducting quantum computation.

5. The present invention uses the thermally coupled cavity. Although a higher ambient temperature leads to a slightly higher population of the thermal photons in the cavity, the increase of the temperature may reduce the dielectric loss of the two-level system, so that a quality factor of a superconducting resonator is improved, and the heating rate is reduced. In addition, the higher ambient temperature also provides greater cooling power and greater thermal conductivity compared with the milli Kelvin environment.

BRIEF DESCRIPTION OF THE DRAWINGS

In order to describe technical schemes in embodiments of the present invention more clearly, and drawings used in the descriptions of the embodiments are briefly introduced below. It is apparent that the drawings in the following descriptions are only some embodiments of the present invention. For those of ordinary skill in the art, other drawings may be obtained according to these drawings under a precondition without any creative work.

FIG. 2 is a flow diagram of an entangled state preparation method based on a superconducting quantum bit and a Rydberg atom in the present invention.

DETAILED DESCRIPTION OF THE EMBODIMENTS

Figure 1:
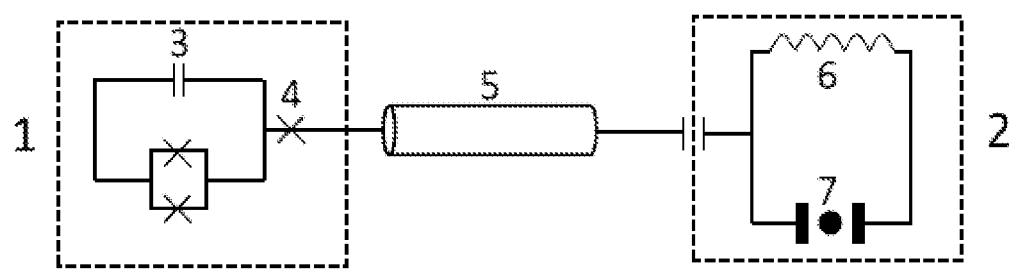
FIG. 1 is a structure schematic diagram of an entangled state preparation device based on a superconducting quantum bit and a Rydberg atom in the present invention.

Implementation modes of the present invention are described below through specific embodiments in combination with drawings, and those who are skilled in the art may easily understand other advantages and effects of the present invention from the content disclosed in the description. The present invention may also be implemented or applied through other different specific embodiments, and various details in the description may also be based on different viewpoints and applications, and various modifications and changes may be made without departing from the spirit of the present invention.

Embodiment 1

FIG. 1 is a structure schematic diagram of an entangled state preparation device based on a superconducting quantum bit and a Rydberg atom in the present invention. As shown in FIG. 1, the entangled state preparation device based on the superconducting quantum bit and the Rydberg atom includes a ≤50 mK refrigeration platform 1 of a dilution refrigerator, a 1 K refrigeration platform 2 of the dilution refrigerator, a superconducting quantum bit 3, a variable coupler 4, a superconducting transmission line cavity 5, a superconducting planar waveguide cavity or superconducting planar LC resonant cavity 6, and a Rydberg atom 7.

Herein the superconducting quantum bit 3 is installed on the ≤50 mK refrigeration platform 1 of the dilution refrigerator; the coupling strength of the superconducting quantum bit 3 and the superconducting transmission line cavity 5 may be modulated by the variable coupler 4; one end of the superconducting transmission line cavity 5 is fixed on the ≤50 mK refrigeration platform 1 of the dilution refrigerator and coupled with the superconducting quantum bit 3, and the other end is fixed on the 1 K refrigeration platform 2 of the dilution refrigerator and coupled with the superconducting planar waveguide cavity/superconducting planar LC resonant cavity 6; and the superconducting planar waveguide cavity/superconducting planar LC resonant cavity 6 is installed on the 1 K refrigeration platform 2 of the dilution refrigerator and coupled with the Rydberg atom 7.

A basic working principle of the entangled state preparation device based on the superconducting quantum bit and the Rydberg atom in the present invention is as follows: the preparation of the non-local entangled state between the superconducting quantum bit 3 and the Rydberg atom 7 is achieved through the superconducting transmission line cavity 5 and the superconducting planar waveguide cavity/superconducting planar LC resonant cavity 6, while the coupling strength J between a superconducting coaxial cable 5 and the superconducting planar waveguide cavity/superconducting planar LC resonant cavity 6 is determined by processing before an experiment. The coupling strength between the superconducting quantum bit 3 and the superconducting transmission line cavity 5 is adjusted by the variable coupler 4, and the coupling strength between the superconducting planar waveguide cavity/superconducting planar LC resonant cavity 6 and the Rydberg atom 7 is adjusted at the same time. When a specific relationship of $J=2\sqrt{g_1 g_2}$ is satisfied and a specific time is selected, a time evolution operator of the Rydberg atom and the superconducting bit is insensitive to a thermal state, so the preparation of the entangled state between the superconducting quantum bit 3 and the Rydberg atom 7 may be achieved.

Specifically, the ≤50 mK refrigeration platform 1 of the dilution refrigerator is used to cool the superconducting quantum bit 3 to maintain a superconducting state thereof, and the 1 K refrigeration platform 2 is used to transfer, imprison, prepare and manipulate the Rydberg atom 7.

Specifically, the superconducting quantum bit 3 is a transmon superconducting quantum bit of a long coherence time.

Specifically, with the help of a driving field added to the quantum bit, an unconventional geometric quantum gate is achieved, so as to generate the entangled state between the quantum bits. At a specific time point, since a phase factor of the evolution operator does not depend on a cavity state, the process is insensitive to the thermal state.

Specifically, the Rydberg atom 7 adopts two energy levels $$|g\rangle = \left|60P_{\frac{5}{2}}, m_J = \frac{1}{2}\right\rangle \text{ and}$$

$$|e\rangle = \left|59D_{\frac{5}{2}}, m_J = \frac{1}{2}\right\rangle$$

of an $^{87}$Rb atom as the quantum bits.

Where $g_1$ is the coupling strength between the superconducting quantum bit and the superconducting transmission line cavity, and may be adjusted by the variable coupler; $g_2$ is the coupling strength between the Rydberg quantum bit and the superconducting planar waveguide cavity or superconducting planar LC resonant cavity, and may be adjusted by changing an angle θ between the quantization axis of the atom and the electric field of the coupled cavity; and J represents the coupling strength between two coupled cavities, and is determined by processing before the experiment.

Specifically, Hamiltonian of a composite system is expressed as (h=1) under rotation wave approximation:

$$H = \sum_{i=1}^{2}\left(\omega_{ri}\hat{a}_i^\dagger \hat{a}_i + \frac{\omega_{qi}}{2}\hat{\sigma}_i^z\right) + \left(\sum_{i=1}^{2} g_i \hat{\sigma}_i^+ \hat{a}_i + J\hat{a}_1^\dagger \hat{a}_2 + H.C.\right)$$

Herein $\omega_{ri}=\omega_r$ is the cavity mode frequency of the i-th cavity, $\omega_{qi}=\omega_q$ is the frequency of the i-th quantum bit; $\hat{\sigma}_i^+ = |e\rangle_i \langle g|$. while i=1, it corresponds to a rise operator of the superconducting quantum bit, and while i=2, it corresponds to a rise operator of the Rydberg atom. $\hat{a}_i^\dagger$ and $\hat{a}_i$ are generation annihilation operators of a cavity mode of the superconducting transmission line cavity respectively; $\hat{a}_2^\dagger$ and $\hat{a}_2$ are generation annihilation operators of a cavity mode of the superconducting planar waveguide cavity or the superconducting planar LC resonant cavity respectively; $g_1$ and $g_2$ are the coupling strength of the superconducting quantum bit and the superconducting transmission line cavity and the coupling strength of the Rydberg atom and the superconducting planar waveguide cavity/superconducting planar LC resonant cavity; and $\hat{\sigma}_i^z$ is a Pauli operator of the i-th quantum bit.

Specifically, the superconducting transmission line cavity is resonantly coupled with the superconducting planar waveguide cavity, or resonantly coupled with the superconducting planar LC resonant cavity. The decorated states of describing coupled cavities system are non-degenerate, and are two eigenmodes with the frequencies $f_1=f+J$ and $f_2=f-J$ respectively, herein f is the frequency of the superconducting transmission line cavity and the superconducting planar waveguide cavity, and J is the coupling strength between the two coupled cavities. Generation annihilation operators of two decorated states are described by the symmetric and antisymmetric superposition of two bare cavity mode operators, namely $$\hat{b}_1 = \frac{\hat{a}_1 + \hat{a}_2}{\sqrt{2}}$$

and $\hat{b}_2 = (\hat{a}_1 - \hat{a}_2)/\sqrt{2}$, in which the two eigenmodes are coupled with the superconducting quantum bit and the Rydberg quantum bit at the same time.

Specifically, the Hamiltonian of the composite system is rewritten as follows according to operators $\hat{b}_1$ and $\hat{b}_2$:

$$H' = \sum_{i=1}^{2}\left(\omega_i' \hat{b}_i^\dagger \hat{b}_i + \frac{\omega_q}{2}\hat{\sigma}_i^z\right) + [\hat{b}_1(g_1\hat{\sigma}_1^\dagger + g_2\hat{\sigma}_2^\dagger) + \hat{b}_2(g_1\hat{\sigma}_1^\dagger - g_2\hat{\sigma}_2^\dagger) + H.C.]/\sqrt{2}$$

Specifically, for the adverse effects of the thermal state during the preparation of the entangled state, the unconventional geometric quantum gate is used to achieve the entanglement of superconducting quantum bit and the Rydberg quantum bit.

Specifically, a strong microwave driving field is added to the two quantum bits, and resonance driving $\omega_d=\omega_q$ is considered. In a rotating coordinate system of the driving frequency, the Hamiltonian of the system becomes:

$$H^{RF} = J\hat{b}_1^\dagger \hat{b}_1 - J\hat{b}_2^\dagger \hat{b}_2 + \Omega\sum_{i=1}^{2}\hat{\sigma}_i^x + [\hat{b}_1(g_1\hat{\sigma}_1^\dagger + g_2\hat{\sigma}_2^\dagger) + \hat{b}_2(g_1\hat{\sigma}_1^\dagger - g_2\hat{\sigma}_2^\dagger) + H.C.]/\sqrt{2}$$

Herein Ω is the rabbi frequency.

Specifically, in a strong driving limit $\Omega \gg \{g_i, J\}$, $H_{eff}^{RF}=H_1+H_2$ is obtained, herein $$H_1 = \left(\hat{b}_1 e^{-iJt} + \hat{b}_1^\dagger e^{iJt}\right)(g_1\hat{\sigma}_1^x + g_2\hat{\sigma}_2^x)/2\sqrt{2}$$

$$H_2 = \left(\hat{b}_2 e^{iJt} + \hat{b}_2^\dagger e^{-iJt}\right)(g_1\hat{\sigma}_1^x - g_2\hat{\sigma}_2^x)/2\sqrt{2}$$

Thus, from $[\hat{H}_1, \hat{H}_2]=0$, the total evolution operator is obtained:

$$U_{eff}(t) = \exp(-iH_{eff}^{RF} dt) = \exp\left(-i\int_0^t H_1 dt\right)\exp\left(-i\int_0^t H_2 dt\right) = U_1 U_2$$

Specifically, by using a Magnus formula, the evolution operator is obtained:

$$U_j(t) =$$

$$\exp\left[-iA_{12}^j(t)\hat{\sigma}_1^x\hat{\sigma}_2^x\right] \times \prod_{i=1}^{2}\exp\left[-i(B_i^j(t)\hat{b}_j\hat{\sigma}_i^x\right] \times \prod_{i=1}^{2}\exp\left[-i(B_i^j(t))*\hat{b}_j^\dagger\hat{\sigma}_i^x\right]$$

When $$t_n = \frac{2n\pi}{J}, B = 0,$$

the coupling between the cavity mode and the quantum bit is effectively removed, the phase factor of the evolution operator does not depend on the cavity state, and the process is insensitive to the thermal state.

Specifically, since the two coupled cavities of the composite system are both fixed on the 1 K platform, each eigenmode is initially in a mixed state in which the equilibrium photon number distribution is $P_n(\bar{n}_i)=\bar{n}_i^n/(1+\bar{n}_i)^{n+1}$, and $\bar{n}_i=(e^{hf_i/k_BT}-1)^{-1}$ is an average photon number of each eigenmode at a temperature T. In order to eliminate the adverse effects of a thermal photon during the preparation of the entangled state, the adverse effects of the thermal state during the preparation of the entangled state are eliminated by a method of introducing the strong driving field into the two quantum bits to achieve the unconventional geometric quantum gate before the operation of a SWAP gate.

The entangled state preparation device based on the superconducting quantum bit and the Rydberg atom of the present invention is capable of, through the thermally coupled cavity, achieving the long-distance entanglement between the superconducting quantum bit placed on the ≤50 mK refrigeration platform and the Rydberg atom quantum bit trapped near the 1 K refrigeration platform, achieving the unconventional geometric quantum operation with the help of the driving field, effectively eliminating the coupling between the quantum bit and the cavity mode, and avoiding the adverse effects of the cavity field thermal state on the entanglement generation process. The quantum state transmission method includes the following steps: the superconducting quantum bit is placed on the ≤50 mK refrigeration platform, and resonantly coupled with a standing wave mode selected by a superconducting NbTi coaxial cable, whose one end is fixed on the ≤50 mK refrigeration platform, and the other end is fixed on the 1 K refrigeration platform; the LC resonator is fixed on the 1 K refrigeration platform, and resonantly coupled with the standing wave mode selected by the superconducting NbTi coaxial cable; the coupling strength $g_1$ of the superconducting quantum bit and the superconducting transmission line cavity is adjusted, and the coupling strength $g_2$ of the Rydberg atom and the superconducting planar waveguide cavity (or the Rydberg atom and the superconducting planar LC resonant cavity) is adjusted, so that they satisfy a relationship of $J=2\sqrt{g_1g_2}$ with the coupling strength J between the superconducting transmission line cavity and the superconducting planar waveguide cavity (or the superconducting transmission line cavity and the superconducting planar LC resonant cavity); and with the help of the driving field added to the quantum bit, the unconventional geometric quantum gate may be achieved, so that the preparation of the entangled state between the quantum bits is achieved. At a specific time point, since the phase factor of the evolution operator does not depend on the cavity state, the process is insensitive to the cavity mode thermal state; and the specific time and parameters are selected so that the evolution operator of the Rydberg atom and the superconducting bit state transmission is insensitive to the thermal state, and the preparation of the entangled state is completed.

The entangled state preparation device based on the superconducting quantum bit and the Rydberg atom of the present invention utilizes a scheme of the unconventional geometric quantum state transmission, so that the preparation of the entangled state is fast in speed and high in fidelity. As long as the coupling strength between the superconducting quantum bit, the Rydberg atom and the two coupled cavities satisfies a specific ratio, the specific time is selected so that the time evolution operator of the Rydberg atom and the superconducting bit state transmission is insensitive to the thermal state, the preparation of the entangled state is completed.

The preparation of the entangled state between the superconducting quantum bit and the Rydberg atom is achieved by the superconducting transmission line cavity of which two ends are fixed on the different refrigeration platforms. Before starting the quantum state transmission, the strong driving field is added to the two quantum bits, so that the process is insensitive to the thermal state, and the fidelity of the preparation of the entangled state may be thus further improved and the superconducting quantum bit is greatly prevented from being disturbed. Based on this scheme, the fidelity and operating speed of the preparation of the non-local entangled state of the superconducting quantum bit and the Rydberg atom may achieve the performance of an existing local system, and a new technological basis is provided for quantum network and distributed quantum computation researches.

Embodiment 2

FIG. 2 is a flow diagram of an entangled state preparation method based on a superconducting quantum bit and a Rydberg atom in the present invention. The main idea of the entangled state preparation method based on the superconducting quantum bit and the Rydberg atom of the present invention is that under the conditions that the coupling strength is adjusted and that the Rydberg atom and the superconducting bit are selected at the specific time so that the time evolution operator is insensitive to the thermal state, the preparation of the entangled state is completed. In addition, the strong driving field is added to achieve the unconventional geometric quantum gate, and the preparation of the non-local entangled state between the superconducting quantum bit and the Rydberg atom is achieved through two coupled cavities:

Step 301: The superconducting quantum bit is resonantly coupled with a selected mode of a superconducting transmission line cavity, at the same time two Rydberg states of the Rydberg atom are resonantly coupled with a superconducting planar waveguide cavity, or the two Rydberg states of the Rydberg atom are resonantly coupled with a superconducting planar LC resonant cavity, and the superconducting planar waveguide cavity or the superconducting planar LC resonant cavity is resonantly coupled with the selected mode of the superconducting transmission line cavity.

Step 302: The coupling strength $g_1$ of the superconducting quantum bit and superconducting transmission line cavity, and the coupling strength $g_2$ of the Rydberg atom and the superconducting planar waveguide cavity (or the superconducting planar LC resonant cavity) are adjusted, so that they satisfy a relationship of $J=2\sqrt{g_1g_2}$ with the coupling strength J between the superconducting transmission line cavity and the superconducting planar waveguide cavity (or the superconducting transmission line cavity and the superconducting planar LC resonant cavity).

Step 303: With the help of two strong microwave driving fields, an unconventional geometric quantum gate is achieved.

Step 304: A specific time is selected so that a time evolution operator of the Rydberg atom and the superconducting bit state transmission is insensitive to a thermal state, by which the preparation of the maximum entangled state is completed.

The present invention may achieve the unconventional geometric quantum gate with the help of the driving field added to the quantum bit, and thereby the generation of the entangled state between the quantum bits is achieved. At a specific time point, since a phase factor of an evolution operator does not depend on the cavity state, the process is insensitive to the thermal state.

Specifically, $g_1$ is the coupling strength between the superconducting quantum bit and the superconducting transmission line cavity, and may be adjusted by the variable coupler; $g_2$ is the coupling strength between the Rydberg quantum bit and the superconducting planar waveguide cavity or superconducting planar LC resonant cavity, and may be adjusted by changing an angle $\theta$ between the quantization axis of the atom and the electric field of the coupled cavity; and J represents the coupling strength between two coupled cavities, and is determined by processing before the experiment.

Specifically, Hamiltonian of a composite system is expressed as ($\hbar=1$) under rotation wave approximation:

$$H = \sum_{i=1}^{2}\left(\omega_{ri}\hat{a}_i^\dagger \hat{a}_i + \frac{\omega_{qi}}{2}\hat{\sigma}_i^z\right) + \left(\sum_{i=1}^{2} g_i \hat{\sigma}_i^\dagger \hat{a}_i + J\hat{a}_1^\dagger \hat{a}_2 + H.C.\right)$$

Herein $\omega_{ri}=\omega_r$ is the cavity mode frequency of the i-th cavity, $\omega_{qi}=\omega_q$ is the frequency of the i-th quantum bit; $\hat{\sigma}_i^+=|e\rangle_i\langle g|$, while i=1, it corresponds to a rise operator of the superconducting quantum bit, and while i=2, it corresponds to a rise operator of the Rydberg atom; $\hat{a}_1^\dagger$ and $\hat{a}_1$ are generation annihilation operators of a cavity mode of the superconducting transmission line cavity respectively; $\hat{a}_2^\dagger$ and $\hat{a}_2$ are generation annihilation operators of a cavity mode of the superconducting planar waveguide cavity or the superconducting planar LC resonant cavity respectively; $g_1$ and $g_2$ are the coupling strength of the superconducting quantum bit and the superconducting transmission line cavity and the coupling strength of the Rydberg atom and the superconducting planar waveguide cavity/superconducting planar LC resonant cavity, respectively. $\hat{\sigma}_i^z$ is a Pauli operator of the i-th quantum bit.

Specifically, the superconducting transmission line cavity and the superconducting planar waveguide cavity/superconducting planar LC resonant cavity are resonantly coupled, and decorated states of describing coupled cavities system are non-degenerate, and there are two eigenmodes with the frequencies $f_1=f+J$ and $f_2=f-J$, respectively, herein f is the frequency of the superconducting transmission line cavity and the superconducting planar waveguide cavity, and the coupling strength between the two coupled cavities. Generation annihilation operators of two decorated states are described by the symmetric and antisymmetric superposition of two bare cavity mode operators, namely $$\hat{b}_1 = \frac{\hat{a}_1 + \hat{a}_2}{\sqrt{2}}$$

and $\hat{b}_2=(\hat{a}_1-\hat{a}_2)/\sqrt{2}$, where the two eigenmodes are coupled with the superconducting quantum bit and the Rydberg quantum bit at the same time.

Specifically, the Hamiltonian of the composite system is rewritten as follows according to operators $\hat{b}_1$ and $\hat{b}_2$:

$$H' = \sum_{i=1}^{2}\left(\omega_i'\hat{b}_i^\dagger \hat{b}_i + \frac{\omega_q}{2}\hat{\sigma}_i^z\right) + [\hat{b}_1(g_1\hat{\sigma}_1^\dagger + g_2\hat{\sigma}_2^\dagger) + \hat{b}_2(g_1\hat{\sigma}_1^\dagger - g_2\hat{\sigma}_2^\dagger) + H.C.]/\sqrt{2}$$

Specifically, for the adverse effects of the thermal state during the preparation of the entangled state, the unconventional geometric quantum gate is used to achieve the entanglement of superconducting quantum bit and the Rydberg quantum bit.

Specifically, a strong microwave driving field is added to the two quantum bits, and resonance driving $\omega_d=\omega_q$ is considered. In a rotating coordinate system of the driving frequency, the Hamiltonian of the system becomes:

$$H^{RF} = J\hat{b}_1^\dagger \hat{b}_1 - J\hat{b}_2^\dagger \hat{b}_2 + \Omega\sum_{i=1}^{2}\hat{\sigma}_i^x + [\hat{b}_1(g_1\hat{\sigma}_1^\dagger + g_2\hat{\sigma}_2^\dagger) + \hat{b}_2(g_1\hat{\sigma}_1^\dagger - g_2\hat{\sigma}_2^\dagger) + H.C.]/\sqrt{2}$$

Herein $\Omega$ is the rabbi frequency.

Specifically, in a strong driving limit $\Omega \gg \{g_i, J\}$, $H_{eff}^{RF}=H_1+H_2$ is obtained, herein $$H_1 = \left(\hat{b}_1 e^{-iJt} + \hat{b}_1^\dagger e^{iJt}\right)(g_1\hat{\sigma}_1^x + g_2\hat{\sigma}_2^x)/2\sqrt{2}$$

$$H_2 = \left(\hat{b}_2 e^{iJt} + \hat{b}_2^\dagger e^{-iJt}\right)(g_1\hat{\sigma}_1^x - g_2\hat{\sigma}_2^x)/2\sqrt{2}$$

Thus, from $[\hat{H}_1, \hat{H}_2]=0$, the total evolution operator is obtained:

$$U_{eff}(t) = \exp\left(-iH_{eff}^{RF} dt\right) = \exp\left(-i\int_0^t H_1 dt\right)\exp\left(-i\int_0^t H_2 dt\right) = U_1 U_2$$

Specifically, by using a Magnus formula, the evolution operator is obtained:

$$U_j(t) = \exp\left[-iA_{12}^j(t)\hat{\sigma}_1^x\hat{\sigma}_2^x\right] \times \prod_{i=1}^{2}\exp\left[-i(B_i^j(t)\hat{b}_j\hat{\sigma}_i^x\right] \times \prod_{i=1}^{2}\exp\left[-i(B_i^j(t))^*\hat{b}_j^\dagger \hat{\sigma}_i^x\right]$$

While $$t_n = \frac{2n\pi}{J}, B = 0,$$

the coupling between the cavity mode and the quantum bit is effectively removed, the phase factor of the evolution operator does not depend on the cavity state, and the process is insensitive to the thermal state.

Specifically, since the two coupled cavities of the composite system are both fixed on the 1 K platform, each eigenmode is initially in a mixed state in which the equilibrium photon number distribution is $P_n(\bar{n}_i)=\bar{n}_i^n/(1+\bar{n}_i)^{n+1}$, where $\bar{n}_i=(e^{\hbar f_i/k_B T}-1)^{-1}$ is an average photon number of each eigenmode at a temperature T. In order to eliminate the adverse effects of a thermal photon during the preparation of the entangled state, the adverse effects of the thermal state during the preparation of the entangled state are eliminated by a method of introducing the strong driving field into the two quantum bits to achieve the unconventional geometric quantum gate before the operation of a SWAP gate.

The entangled state preparation method of the superconducting quantum bit and the Rydberg atom provided by the present invention is that the coupling strength between the superconducting quantum bit, the Rydberg atom and two coupled cavities is adjusted to satisfy the specific relationship. The strong driving field is simultaneously added, and the specific time is selected so that the time evolution operator of the Rydberg atom and the superconducting bit is insensitive to the thermal state, and finally the preparation of the maximum entangled state is completed. The superconducting transmission line cavity of which two ends are respectively fixed on the ≤50 mK and 1 K refrigeration plates is used to be coupled with the superconducting planar waveguide cavity or the superconducting planar LC resonant cavity so as to achieve the preparation of the non-local entangled state of the superconducting quantum bit and the Rydberg atom, so the influence of the laser field and magnetic field required by the Rydberg atom on the coherence of the superconducting quantum bit may be reduced. The driving field is introduced into the two-quantum-bit system, and the adverse effects of the thermal state are eliminated with the help of the unconventional geometric quantum gate, so a new technology is provided for the fast-speed and high-fidelity preparation of the entangled state between the superconducting quantum bit and the Rydberg atom.

The above-mentioned embodiments are only to express several implementation modes of the present invention, and the descriptions thereof are relatively specific and detailed, but it should not be understood as limitation to a patent scope of the present invention. It should be pointed out that, for those of ordinary skill in the art, a plurality of modifications and improvements may be made under a precondition without departing from the concept of the present invention, and these all fall within a scope of protection of the present invention. Therefore, the scope of protection of the patent of the present invention should be subject to the appended claims.

What is claimed is:

1. An entangled state preparation method based on a superconducting quantum bit and a Rydberg atom, wherein it comprises the following steps:
resonantly coupling the superconducting quantum bit with a selected mode of a superconducting transmission line cavity, at the same time, resonantly coupling two Rydberg states of the Rydberg atom with a superconducting planar waveguide cavity/superconducting planar LC resonant cavity, and resonantly coupling the superconducting planar waveguide cavity/superconducting planar LC resonant cavity with the selected mode of the superconducting transmission line cavity;

adjusting the coupling strength $g_1$ of the superconducting quantum bit and superconducting transmission line cavity, and the coupling strength $g_2$ of the Rydberg atom and the superconducting planar waveguide cavity/superconducting planar LC resonant cavity, so that they satisfy a relationship of $J=2\sqrt{g_1 g_2}$ with the coupling strength J between the superconducting transmission line cavity and the superconducting planar waveguide cavity/superconducting planar LC resonant cavity;

with the help of two strong microwave driving fields, achieving an unconventional geometric quantum gate, so that the effective coupling between the quantum bits is generated; and selecting a specific time so that a time evolution operator of the Rydberg atom and the superconducting bit state transmission is insensitive to a thermal state, and completing the preparation of a maximum entangled state.

2. The entangled state preparation method based on the superconducting quantum bit and the Rydberg atom as claimed in claim 1, wherein Hamiltonian of a composite system is expressed as follows under rotation wave approximation:

$$H = \sum_{i=1}^{2}\left(\omega_{ri}\hat{a}_i^\dagger \hat{a}_i + \frac{\omega_{qi}}{2}\hat{\sigma}_i^z\right) + \left(\sum_{i=1}^{2} g_i \hat{\sigma}_i^+ \hat{a}_i + J\hat{a}_1^\dagger \hat{a}_2 + H.C.\right),$$

wherein $\omega_{ri}=\omega_r$ is the cavity mode frequency of the i-th cavity, $\omega_{qi}=\omega_q$ is the frequency of the i-th quantum bit; $\hat{\sigma}_i^+=|e\rangle_i\langle g|$, while i=1, it corresponds to a rise operator of the superconducting quantum bit, and while i=2, it corresponds to a rise operator of the Rydberg atom; $\hat{a}_1^\dagger$ and $\hat{a}_1$ are generation annihilation operators of a cavity mode of the superconducting transmission line cavity respectively; $\hat{a}_2^\dagger$ and $\hat{a}_2$ are generation annihilation operators of a cavity mode of the superconducting planar waveguide cavity or the superconducting planar LC resonant cavity respectively; $g_1$ and $g_2$ are the coupling strength of the superconducting quantum bit and the superconducting transmission line cavity and the coupling strength of the Rydberg atom and the superconducting planar waveguide cavity/superconducting planar LC resonant cavity; and $\hat{\sigma}_i^z$ is a Pauli operator of the i-th quantum bit.

3. The entangled state preparation method based on the superconducting quantum bit and the Rydberg atom as claimed in claim 2, wherein the superconducting transmission line cavity and the superconducting planar waveguide cavity/superconducting planar LC resonant cavity are resonantly coupled, and decorated states of describing coupled cavities system are non-degenerate, and are two eigenmodes with the frequencies $f_1=f+J$ and $f_2=f-J$ respectively, wherein f is the frequency of the superconducting transmission line cavity and the superconducting planar waveguide cavity, and J is the coupling strength between the two coupled cavities; generation annihilation operators of two decorated states are described by the symmetric and antisymmetric superposition of two bare cavity mode operators, namely $$\hat{b}_1 = \frac{\hat{a}_1 + \hat{a}_2}{\sqrt{2}}$$

and $\hat{b}_2=(\hat{a}_1-\hat{a}_2)/\sqrt{2}$, the two eigenmodes are coupled with the superconducting quantum bit and the Rydberg quantum bit at the same time.

4. The entangled state preparation method based on the superconducting quantum bit and the Rydberg atom as claimed in claim 3, wherein the Hamiltonian of the composite system is rewritten as $H_r=H_1+H_2$ according to operators $\hat{b}_1$ and $\hat{b}_2$, wherein:

$$H_1 = J\hat{b}_1^\dagger \hat{b}_1 + [\hat{b}_1(g_1\hat{\sigma}_1^\dagger + g_2\hat{\sigma}_2^\dagger) + H.C.]/\sqrt{2}$$

$$H_2 = -J\hat{b}_2^\dagger \hat{b}_2 + [\hat{b}_2(g_1\hat{\sigma}_1^\dagger - g_2\hat{\sigma}_2^\dagger) + H.C.]/\sqrt{2}$$

in a strong driving limit $\omega \gg \{g_i, J\}$, $H_{eff}^{RF}=H_1+H_2$ is obtained, wherein $$H_1 = (\hat{b}_1 e^{-iJt} + \hat{b}_1^\dagger e^{iJt})(g_1\hat{\sigma}_1^x + g_2\sigma_2^x)/2\sqrt{2}$$

$$H_2 = (\hat{b}_2 e^{iJt} + \hat{b}_2^\dagger e^{-iJt})(g_1\hat{\sigma}_1^x - g_2\sigma_2^x)/2\sqrt{2}$$

due to $H_1$ and $H_2$ reciprocity, the evolution operator can be decomposed into:

$$U_{eff}(t) = e^{-i\int_0^t H_{eff} dt} = e^{-i\int_0^t H_1 dt} e^{-i\int_0^t H_2 dt} = U_1 U_2$$

while $$t_n = \frac{2n\pi}{J},$$

the evolution operator is insensitive to the thermal state.

5. The entangled state preparation method based on the superconducting quantum bit and the Rydberg atom as claimed in claim 1, wherein each eigenmode is initially in a mixed state in which the equilibrium photon number distribution is $P_n(\bar{n}_i)=\bar{n}_i^n/(1+\bar{n}_i)^{n+1}$, $\bar{n}_i=(e^{hf_i/k_BT}-1)^{-1}$ is an average photon number of each eigenmode at a temperature T, and $f_i$ is the frequency of the i-th cavity; in order to reduce the adverse effects of a thermal photon during the preparation of the entangled state, the strong driving field is introduced in the quantum bit before the unconventional geometric quantum gate operation, and the adverse effects of a thermal mode on the preparation of the entangled state are eliminated by a method of the unconventional geometric quantum gate.

6. An entangled state preparation device based on a superconducting quantum bit and a Rydberg atom, wherein it comprises a ≤50 mK refrigeration platform of a dilution refrigerator, a 1 K refrigeration platform of the dilution refrigerator, a superconducting quantum bit, a variable coupler, a superconducting transmission line cavity, a superconducting planar waveguide cavity/superconducting planar LC resonant cavity, and a Rydberg atom;

wherein the superconducting quantum bit is installed on the ≤50 mK refrigeration platform of the dilution refrigerator; the coupling strength of the superconducting quantum bit and the superconducting transmission line cavity can be modulated by the variable coupler; one end of the superconducting transmission line cavity is fixed on the ≤50 mK refrigeration platform 1 of the dilution refrigerator and coupled with the superconducting quantum bit, and the other end is fixed on the 1 K refrigeration platform of the dilution refrigerator and coupled with the superconducting planar waveguide cavity/superconducting planar LC resonant cavity; and the superconducting planar waveguide cavity/superconducting planar LC resonant cavity is installed on the 1 K refrigeration platform of the dilution refrigerator and coupled with the Rydberg atom; and the preparation of the non-local entangled state between the superconducting quantum bit and the Rydberg atom is achieved through the superconducting transmission line cavity and the superconducting planar waveguide cavity/superconducting planar LC resonant cavity, and the coupling strength J between a superconducting coaxial cable and the superconducting planar waveguide cavity/superconducting planar LC resonant cavity is determined by processing before an experiment, and the coupling strength between the superconducting quantum bit and the superconducting transmission line cavity is adjusted by the variable coupler, and the coupling strength between the superconducting planar waveguide cavity/superconducting planar LC resonant cavity and the Rydberg atom is adjusted at the same time, while a specific relationship of $J=2\sqrt{g_1 g_2}$ is satisfied and a specific time is selected, a time evolution operator of the Rydberg atom and the superconducting bit is insensitive to a thermal state, so the preparation of the entangled state between the superconducting quantum bit and the Rydberg atom can be achieved.

7. The entangled state preparation device based on the superconducting quantum bit and the Rydberg atom as claimed in claim 6, wherein the ≤50 mK refrigeration platform of the dilution refrigerator is used to cool the superconducting quantum bit to maintain a superconducting state thereof, and the 1 K refrigeration platform is used to transfer, imprison, prepare and manipulate the Rydberg atom.

8. The entangled state preparation device based on the superconducting quantum bit and the Rydberg atom as claimed in claim 6, wherein the superconducting quantum bit is a transmon superconducting quantum bit of a long coherence time.

9. The entangled state preparation device based on the superconducting quantum bit and the Rydberg atom as claimed in claim 6, wherein, with the help of a driving field added to the quantum bit, an unconventional geometric quantum gate is achieved, and thereby the generation of the entangled state between the quantum bits is achieved; and at a specific time point, since a phase factor of the evolution operator does not depend on a cavity state, the process is insensitive to the thermal state.

10. The entangled state preparation device based on the superconducting quantum bit and the Rydberg atom as claimed in claim 6, wherein the Rydberg atom adopts two energy levels $$|g\rangle = \left|60P_{\frac{5}{2}}, m_J = \frac{1}{2}\right\rangle \text{ and } |e\rangle = |e\rangle = \left|59D_{\frac{5}{2}}, m_J = \frac{1}{2}\right\rangle$$

of an $^{87}$Rb atom as the quantum bits.

* * * * *